United States Patent
Wu et al.

(10) Patent No.: US 10,097,407 B2
(45) Date of Patent: Oct. 9, 2018

(54) METHOD, EQUIPMENT, DEVICE AND SYSTEM FOR SENDING DEVICE DETECTION SIGNAL

(71) Applicant: ZTE CORPORATION, Shenzhen, Guangdong Province (CN)

(72) Inventors: Shuanshuan Wu, Shenzhen (CN); Shuqiang Xia, Shenzhen (CN); Ming Yuan, Shenzhen (CN); Jin Yang, Shenzhen (CN); Wenhuan Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/322,454

(22) PCT Filed: Mar. 30, 2015

(86) PCT No.: PCT/CN2015/075416
§ 371 (c)(1),
(2) Date: Mar. 16, 2017

(87) PCT Pub. No.: WO2016/000468
PCT Pub. Date: Jan. 7, 2016

(65) Prior Publication Data
US 2017/0207955 A1    Jul. 20, 2017

(30) Foreign Application Priority Data
Jun. 30, 2014 (CN) .......................... 2014 1 0306771

(51) Int. Cl.
*H04L 12/24*    (2006.01)
*H04J 1/02*    (2006.01)
(Continued)

(52) U.S. Cl.
CPC ................ *H04L 41/08* (2013.01); *H04J 1/02* (2013.01); *H04L 41/12* (2013.01); *H04W 8/005* (2013.01); *H04W 48/16* (2013.01)

(58) Field of Classification Search
CPC ............... H04L 5/0007; H04L 27/2636; H04L 27/2646; H04L 27/2666; H04L 27/2698;
(Continued)

(56) References Cited

U.S. PATENT DOCUMENTS

| | | | |
|---|---|---|---|
| 2013/0157670 A1* | 6/2013 | Koskela | H04W 76/14 455/450 |
| 2014/0003262 A1* | 1/2014 | He | H04W 28/08 370/252 |
| 2014/0056220 A1* | 2/2014 | Poitau | H04W 76/14 370/328 |

FOREIGN PATENT DOCUMENTS

| | | |
|---|---|---|
| CN | 103442442 A | 12/2013 |
| CN | 103686676 A | 3/2014 |

(Continued)

OTHER PUBLICATIONS

3GPP, 3rd Generation Partnership Project, Technical Specification Group Radio Access Network, Study on LTE Device to Device Proximity Services, 3GPP TR 36.843, V12.0.1, Mar. 2014, XP050770026.
(Continued)

*Primary Examiner* — Jung Liu
(74) *Attorney, Agent, or Firm* — Ling Wu; Stephan Yang; Ling and Yang Intellectual Property

(57) ABSTRACT

The present disclosure discloses a method, apparatus, device and system for sending device discovery signals. The method includes: acquiring configuration information indicating discovery resources for device discovery; determining discovery resource elements for sending the device discovery signals in a discovery resource period indicated by
(Continued)

the configuration information, the discovery resource elements being obtained by dividing radio resources in the discovery resource period in a manner of time division multiplexing and/or frequency division multiplexing; and sending the device discovery signals on the determined discovery resource elements.

16 Claims, 9 Drawing Sheets

(51) Int. Cl.
  *H04W 8/00* (2009.01)
  *H04W 48/16* (2009.01)
(58) Field of Classification Search
  CPC ... H04L 5/0035; H04L 5/0055; H04L 5/0057; H04L 12/2869; H04L 12/5695; H04L 47/00; H04L 47/70; H04L 47/78; H04L 47/821; H04L 47/827; H04W 72/04
  See application file for complete search history.

(56) References Cited

FOREIGN PATENT DOCUMENTS

| CN | 103686740 A | 3/2014 |
| CN | 103997788 A | 8/2014 |
| CN | 104349421 A | 2/2015 |
| WO | WO2014042565 A1 | 3/2014 |

OTHER PUBLICATIONS

Qualcomm Incorporated, Resource Allocation for Type 1 D2D Discovery, 3GPP TSG-RAN WG1 #77, May 19-23, 2014, Seoul , Korea ,XP050789087, R1-141967.

Huawei, HiSilicon, Procedures for Type 1 and Type 2 Discovery Resource Allocation, 3GPP TSG RAN WG2 Meeting #85bis, Valencia, Spain, Mar. 31-Apr. 4, 2014, XP050817845, R2-141436.

* cited by examiner

| 7 | 15 | 23 |
|---|----|----|
| 6 | 14 | 22 |
| 5 | 13 | 21 |
| 4 | 12 | 20 |
| 3 | 11 | 19 |
| 2 | 10 | 18 |
| 1 | 9  | 17 |
| 0 | 8  | 16 |

FIG. 10a

| 3  | 12 | 22 |
|----|----|----|
| 11 | 16 | 6  |
| 21 | 0  | 14 |
| 5  | 8  | 18 |
| 13 | 23 | 2  |
| 17 | 7  | 10 |
| 1  | 15 | 20 |
| 9  | 19 | 4  |

FIG. 10b

| 7 | 15 | 23 |
| 6 | 14 | 22 |
| 5 | 13 | 21 |
| 4 | 12 | 20 |
| 3 | 11 | 19 |
| 2 | 10 | 18 |
| 1 | 9  | 17 |
| 0 | 8  | 16 | k ↑    → n

FIG. 11a

| 5  | 8  | 18 |
| 13 | 23 | 2  |
| 17 | 7  | 10 |
| 1  | 15 | 20 |
| 9  | 19 | 4  |
| 22 | 3  | 12 |
| 6  | 11 | 16 |
| 14 | 21 | 0  |

“METHOD, EQUIPMENT, DEVICE AND SYSTEM FOR SENDING DEVICE DETECTION SIGNAL

TECHNICAL FIELD

The present disclosure relates to the field of communication technologies and in particular to a method, apparatus, device and system for sending device discovery signals.

BACKGROUND

In a cellular communication system, when service data is transmitted between two user equipment (UE), for example, the service data from a user equipment 1 (UE1) to a user equipment 2 (UE2) is first transmitted, via an air interface, to a base station (e.g., a Node B or an evolved Node B (eNB) in the third generation mobile communication) of a cell where the UE1 is located. The base station transmits the service data to a base station of a cell where the UE2 is located through a core network, and then the base station of the cell where the UE2 is located transmits the service data to the UE2 via the air interface. The service data is transmitted from the UE2 to the UE1 using the similar processing procedure. As shown in FIG. 1a, when the UE1 and the UE2 are located in the same cellular cell, although the two UEs are covered by the cell of the same base station, the data still needs to be transferred via the core network upon transmission, and two radio spectrum resources will still be consumed in a single data transmission process.

Thus it can be seen that the cellular communication method described above is not optimal if the UE 1 and the UE 2 are located in the same cell and closer to each other. However, actually, as mobile communication services become diversified, for example, popularization of applications such as social networks, e-payment and the like in wireless communication systems causes the demand for service transmission between users at close range to grow increasingly. Thus, a device-to-device (D2D) communication mode is received extensive attention. As shown in FIG. 1b, the D2D communication mode, which is also called proximity service (ProSe), means that the service data is transmitted directly from a source UE to a target UE via the air interface without forwarding by the base station or core network. For the users communicating with each other at close range, the D2D not only saves radio spectrum resources but also reduces the data transmission pressure of the core network.

In cellular communications, when two UEs are communicating with each other, one UE is generally unaware of the location of the other UE, thus a communication link with the other UE is required to be established via a network side device (e.g., a base station or core network device). For the device-to-device communication, the precondition for the establishment of the communication link is the mutual discovery between the UEs. Because of the half-duplex characteristic of the D2D communication, the UEs are incapable of receiving device discovery signals when sending the device discovery signals or incapable of sending device discovery signals when receiving the device discovery signal. As a result, when the UEs send the device discovery signals at the same time, they cannot discover each other, which limits the application of the D2D communication.

SUMMARY

In view of this, embodiments of the present disclosure provide a method, apparatus, device and system for sending device discovery signals so as to at least solve the problems described above existing in the prior art.

In order to achieve the purpose described above, technical schemes of the embodiments of the present disclosure are implemented as follow:

An embodiment of the present disclosure provides a method for sending device discovery signals, which includes:

acquiring configuration information indicating discovery resources for device discovery;

determining at most one discovery resource element for sending the device discovery signals in a discovery resource period indicated by the configuration information, the discovery resource element being obtained by dividing radio resources in the discovery resource period in a manner of time division multiplexing and/or frequency division multiplexing; and sending the device discovery signals on the determined discovery resource element.

The embodiment of the present disclosure further provides an apparatus for sending device discovery signals, which includes:

a first communication unit arranged to receive configuration information indicating discovery resources for device discovery;

a central processing unit arranged to determine, based on the configuration information, at most one discovery resource element for sending the device discovery signals in a discovery resource period indicated by the configuration information, the discovery resource element being obtained by dividing radio resources in the discovery resource period by the central processing unit in a manner of time division multiplexing and/or frequency division multiplexing; and a second communication unit arranged to send the device discovery signals on the determined discovery resource element.

An embodiment of the present disclosure further provides a user equipment including the apparatus for sending device discovery signals described above.

An embodiment of the present disclosure further provides a method for sending device discovery signals, which includes:

acquiring configuration information indicating discovery resources for device discovery;

determining discovery resource elements for sending the device discovery signals in a discovery resource period indicated by the configuration information, the discovery resource elements being obtained by dividing radio resources in the discovery resource period in a manner of time division multiplexing and/or frequency division multiplexing; and sending the device discovery signals on the determined discovery resource elements.

An embodiment of the present disclosure further provides a method for sending device discovery signals, which includes:

determining configuration information indicating discovery resources for device discovery, the configuration information indicating the periodic discovery resources, discovery resource elements being obtained by dividing radio resources in the discovery resource period in a manner of time division multiplexing and/or frequency division multiplexing, and the discovery resource elements being used by a user equipment to send the device discovery signals; and sending the configuration information.

An embodiment of the present disclosure further provides an apparatus for sending device discovery signals, which includes:

a first communication unit arranged to receive configuration information indicating discovery resources for device discovery;

a central processing unit arranged to determine, based on the configuration information, discovery resource elements for sending the device discovery signals in a discovery resource period indicated by the configuration information, the discovery resource elements being obtained by dividing radio resources in the discovery resource period by the central processing unit in a manner of time division multiplexing and/or frequency division multiplexing; and a second communication unit arranged to send the device discovery signals on the determined discovery resource elements.

An embodiment of the present disclosure further provides a user equipment including the apparatus for sending device discovery signals described above.

An embodiment of the present disclosure further provides an apparatus for sending device discovery signals, which includes:

a configuration unit arranged to determine configuration information indicating discovery resources for device discovery;

a sending unit arranged to send the configuration information, the configuration information indicating the periodic discovery resources, discovery resource elements being obtained by dividing radio resources in the discovery resource period in a manner of time division multiplexing and/or frequency division multiplexing, and the discovery resource elements being used by a user equipment to send the device discovery signals.

An embodiment of the present disclosure further provides a network side device, which is the apparatus for sending device discovery signals described above.

An embodiment of the present disclosure further provides a system for sending device discovery signals, which includes the user equipment and network side device of a cellular network described above.

The technical schemes of the embodiments of the present disclosure solve the half-duplex problem in the device discovery of device-to-device communication systems so as to avoid the problem that the UEs cannot discover each other when sending and monitoring the discovery signals at the same time, and have strong versatility.

BRIEF DESCRIPTION OF DRAWINGS

FIG. 10a is a schematic diagram 3 of positions of discovery resource elements in the preceding discovery resource period the current discovery resource period according to an embodiment of the present disclosure;

FIG. 10b is a schematic diagram 4 of positions of discovery resource elements in the current discovery resource period according to an embodiment of the present disclosure;

FIG. 11a is a schematic diagram 5 of positions of discovery resource elements in the preceding discovery resource period of the current discovery resource period according to an embodiment of the present disclosure;

FIG. 11b is a schematic diagram 6 of positions of discovery resource elements in the current discovery resource period according to an embodiment of the present disclosure;

SPECIFIC EMBODIMENTS OF THE PRESENT DISCLOSURE

The present disclosure will be described below in detail in conjunction with the accompanying drawings and specific embodiments. It should be noted that the embodiments of the present disclosure and features in the embodiments can be combined in the case of no conflict.

The technical schemes described in the embodiments of the present disclosure are applicable to cellular wireless communication systems or the Internet. Technologies used by common cellular wireless communication systems include Code Division Multiplexing Access (CDMA) technology, Frequency Division Multiplexing Access (FDMA) technology, Orthogonal-FDMA (OFDMA) technology and Single Carrier-FDMA (SC-FDMA) technology. For example, the downlink (or called forward link) of a 3rd Generation Partnership Project (3GPP) Long Term Evolution (LTE)/LTE-Advanced (LTE-A) cellular communication system is based on the OFDMA technology and the uplink (or called reverse link) is based on the SC-FDMA technology. In future, it is possible that a hybrid multiple-access technology can be supported on a link.

In an OFDMA/SC-FDMA system, radio resources for communication are in a two-dimensional time-frequency form.

Figure 1A:
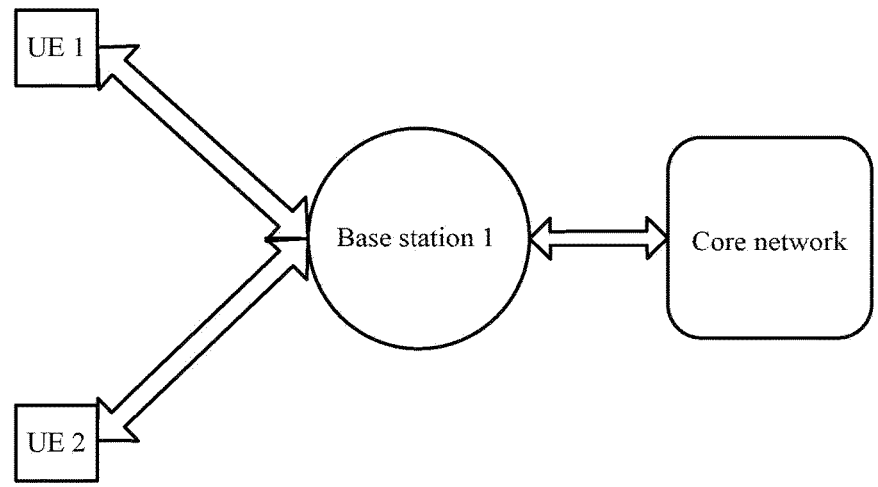
FIG. 1a is a schematic diagram 1 of cellular communication and D2D communication between UEs in the same base station cell in the related art.
Figure 1B:
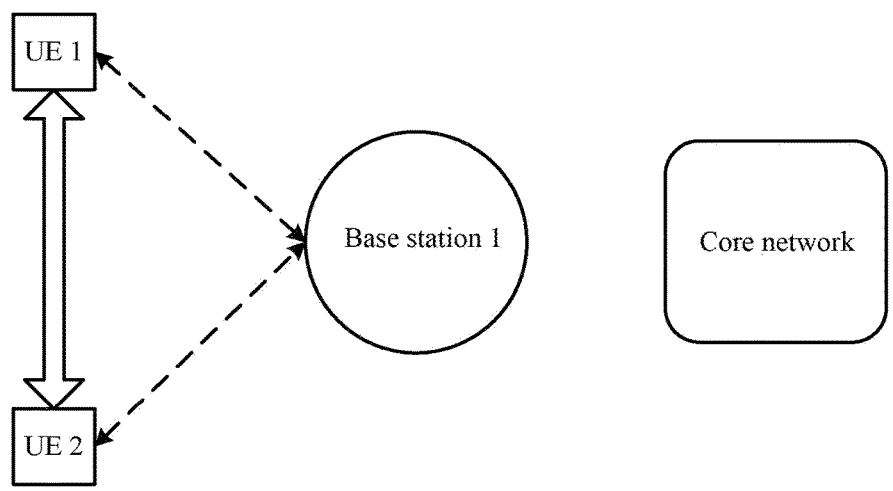
FIG. 1b is a schematic diagram 2 of cellular communication and D2D communication between UEs in the same base station cell in the related art.
Figure 2:
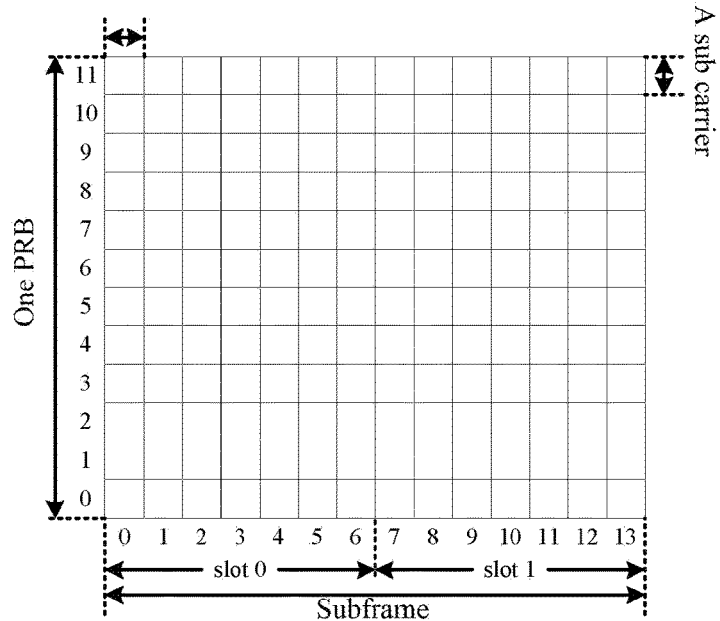
FIG. 2 is a schematic diagram of a radio resource structure in the related art.

For example, for an LTE/LTE-A system, communication resources of the uplink and the downlink are divided in the time dimension by taking a radio frame as a unit; each radio frame is 10 ms (millisecond) in length, and includes 10 subframes with the length of 1 ms; each subframe includes two slots with the length of 0.5 ms. As shown in FIG. 2, according to different configurations of the periodic prefix (CP), each slot includes 6 or 7 OFDM or SC-FDM symbols.

In the frequency dimension, the resources are divided by taking a sub carrier as a unit. In communication, the smallest unit for allocation of frequency-domain resources is resource block (RB) corresponding to a physical resource block (PRB) of physical resources. As shown in FIG. 2, a PRB includes 12 sub carries in the frequency domain, which correspond to a slot in the time domain. A resource corresponding to a sub carrier on each OFDM-SC-FDM symbol is referred to as a resource element (RE).

In LTE/LTE-A cellular communication, a UE discovers an LTE network by detecting a synchronization signal (SS). The synchronization signal includes a primary synchronization signal (PSS) and a secondary synchronization signal (SSS). The UE obtains downlink frequency and time synchronization with a base station by detecting the synchronization signal. Moreover, because the synchronization signal carries a physical cell identity, the detection of the synchronization signal also means that the UE discovers an LTE/LTE-A cell.

On the uplink, when the UE needs to transmit uplink data, it initiates random access (RA) to carry out uplink synchronization and establish a radio resources control (RRC) connection, that is, the UE enters an RRC connected state from an RRC idle state. Upon random access, the UE needs to send a random access preamble, and a network side device detects the random access preamble in a specific time-frequency resource to implement identification of the UE and synchronization of the uplink.

A similar problem of mutual discovery between communication devices exists in D2D communication, that is, the UE performing the D2D communication needs first to implement discovery of its opposite UE, which is referred to as discovery of D2D communication, D2D discovery or device discovery in the embodiment. The D2D discovery is implemented by transmission and detection of a discovery signal. The discovery signal may be in the form of a sequence, such as a synchronization signal, a random access preamble, a reference signal and the like in a cellular network, the discovery signal may also be in other forms of a sequence having a similar structure, such as a Zadoff-Chu (ZC) sequence, Walsh codes and the like; the discovery signal may also be a packet or message with a specific modulation and encoding mode; and the discovery signal may also be in the form of combination of a sequence and a packet or in the form of a message. In the embodiment, for the sake of convenience of description, a physical channel for transmitting D2D discovery signals is named as Physical ProSe Discovery Channel (PPDCH). It should be noted that the name is not to be construed as an inappropriate limitation to the present disclosure.

Figure 3:
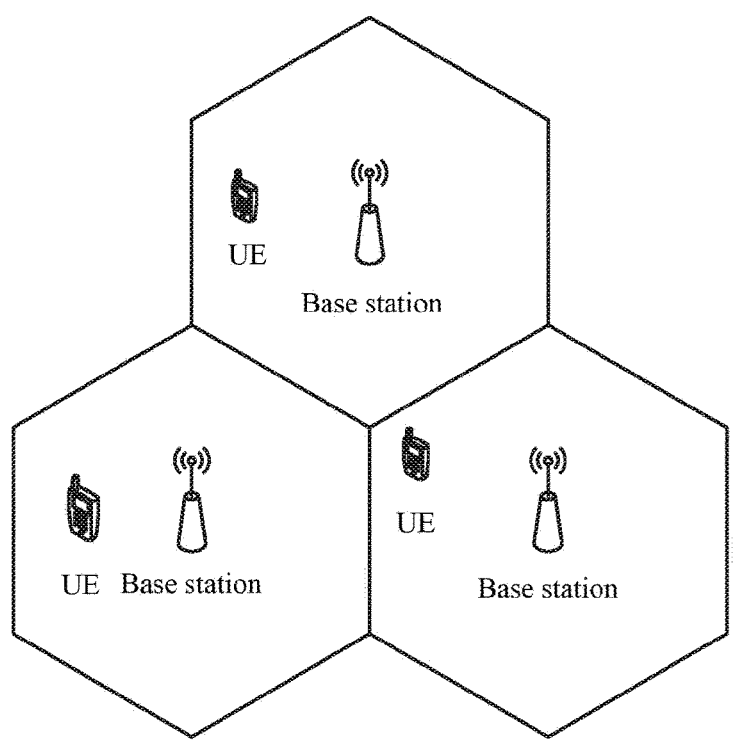
FIG. 3 is a schematic diagram of deployment of a cellular network in the related art.

FIG. 3 illustrates a schematic diagram of network deployment of a cellular wireless communication system, which may use the 3GPP LTE/LTE-A technology or other cellular wireless communication technologies described above. In an access network of the cellular wireless communication system, network devices generally include a certain number of base stations and other network entities or network elements. In summary, in the 3GPP, the network devices may be collectively referred to as Evolved Versatile Terrestrial Radio Access Network (E-UTRAN) side devices, or network side devices of the cellular network for short. The base stations (BS, or Node B, or evolved Node B (eNB)) include low power nodes (LPN) in the network, such as pico base stations, relay nodes, femto cells and home eNBs (HeNB). For the sake of convenience of description, only three base stations are shown in FIG. 3. Each of the base stations provides a specific radio signal coverage area in which terminals, UEs or devices can communicate with the base station wirelessly. The radio signal coverage area of a base station may be divided into one or more cells or sectors, for example, three cells, according to some rules.

At present, application of the D2D discovery discussed in the 3GPP includes two distinct scenarios: an in-network scenario and an out-of-network scenario. The in-network means that UEs performing D2D discovery are located in the coverage area of the cellular network, for example, the scenario shown in FIG. 3; the out-of-network means that locations of the UEs performing the D2D discovery are not covered by the cellular network, for example, a coverage blind area where the network coverage does not reach or a coverage blind area caused by damage of a network device.

Embodiment 1

Figure 4:
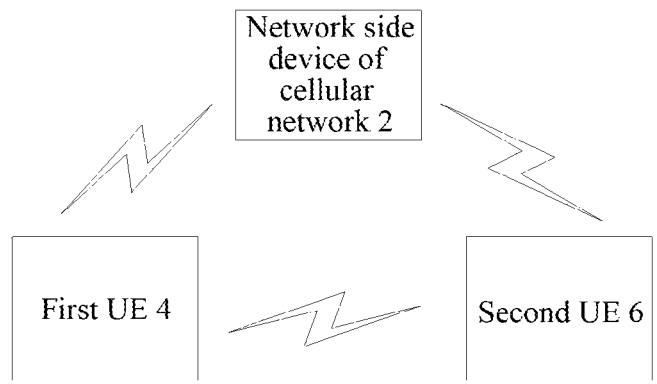
FIG. 4 is a structural schematic diagram of a wireless communication system according to an embodiment of the present disclosure.

In accordance with an embodiment of the present disclosure, a structural schematic diagram of a system for sending device discovery signals, which, as shown in FIG. 4, includes a network side device 2 of a cellular network, a first UE 4 and a second UE 6, is provided. Each of the entities will be described below respectively.

In an embodiment, the network side device 2 of the cellular network determines configuration information indicating discovery resources for device discovery and sends the configuration information.

The first UE 4 is arranged to determine discovery resource elements for sending the device discovery signals in a discovery resource period indicated by the configuration information, the discovery resource elements being obtained by dividing radio resources in the discovery resource period in a manner of time division multiplexing and/or frequency division multiplexing; and send the device discovery signals on the discovery resource elements.

The second UE 6 is arranged to detect the device discovery signals.

The first UE 4 is further arranged to establish a mapping relationship of the discovery resource elements between adjacent discovery resource periods; and determine at most one discovery resource element for sending the device discovery signals in the current discovery resource period according to positions of the discovery resource elements which send the device discovery signals in a preceding discovery resource period of a current discovery resource period and the mapping relationship.

It should be noted that the preceding discovery resource period refers to a discovery resource period adjacent in time to the current discovery resource period or a discovery resource period during which the user equipment sends the device discovery signals last time, which is described similarly in the following.

The first UE 4 is further arranged to establish mapping relationships $k2=\mathrm{mod}(\mathrm{floor}((n1*K+k1+A)/N),K)$ and $n2=\mathrm{mod}(n1*K+k1+A,N)$; or establish mapping relationships $n2=\mathrm{mod}(\mathrm{floor}((k1*N+n1+B)/K),N)$ and $k2=\mathrm{mod}(k1*N+n1+B,K)$; or establish mapping relationships $k2=\mathrm{mod}(k1+M,K)$ and $n2=\mathrm{mod}(n1+k1+L,N)$; and interleave frequency positions of the discovery resource elements in the preceding discovery resource period of the current discovery resource period using an interleaver, establish a mapping relationship between frequency positions of the discovery resource elements in the preceding discovery resource period of the current discovery resource period and frequency positions of the discovery resource elements in the current discovery resource period according to the result of the interleaving, and establish a mapping relationship of $n2=\mod(n1+k1+L,N)$;

herein floor(a) represents a rounding down operation; mod(a,b) represents a modulo operation; n1 and k1 identify time positions and frequency positions of the discovery resource elements in the preceding discovery resource period of the current discovery resource period, respectively; n2 and k2 identify time positions and frequency positions of the discovery resource elements in the current discovery resource period, respectively; N represents the number of the discovery resource elements in a time direction; K represents the number of the discovery resource elements in a frequency direction; and values of A, M and L are all integers.

The first UE 4 is further arranged to interleave positions of the discovery resource elements in the preceding discovery resource period of the current discovery resource period using the interleaver and establish a mapping relationship between the positions of the discovery resource elements in the preceding discovery resource period of the current discovery resource period and positions of the discovery resource elements in the current discovery resource period according to the result of the interleaving.

The first UE 4 is further arranged to randomly select the time positions of the discovery resource elements for sending the device discovery signals in the time direction of discovery resources in the current discovery resource period and establish the following mapping relationship between the frequency positions of the discovery resource elements in the preceding discovery resource period of the current discovery resource period and the frequency positions of the discovery resource element in the current discovery resource period: $k2=\mod(k1+M,K)$;

herein n1 identifies the time positions of the discovery resource elements in the preceding discovery resource period of the current discovery resource period; n2 and k2 identify the time positions and the frequency positions of the discovery resource elements in the current discovery resource period, respectively; N represents the number of the discovery resource elements in the time direction; K represents the number of the discovery resource elements in the frequency direction; and the value of L is an integer; or interleave the frequency positions of the discovery resource elements in the preceding discovery resource period of the current discovery resource period using the interleaver, establish a mapping relationship between the frequency positions of the discovery resource elements in the preceding discovery resource period of the current discovery resource period and the frequency positions of the discovery resource elements in the current discovery resource period according to the result of the interleaving;

determine the frequency positions of the discovery resource elements for sending the device discovery signals in the current discovery resource period according to the frequency positions of the discovery resource elements which send the device discovery signals in the preceding discovery resource period of the current discovery resource period and one of the established mapping relationships; and determine the discovery resource elements corresponding to the selected time positions and the determined frequency positions as the discovery resource elements for sending the device discovery signals.

The first UE 4 is further arranged to determine the positions of the discovery resource elements for sending the device discovery signals for the first time by any one of:

randomly selecting the positions of the discovery resource elements for sending the device discovery signals;

determining the time positions and/or frequency positions of the discovery resource elements for sending the device discovery signals according to a user equipment identity; and determining the time positions and/or frequency positions of the discovery resource element for sending the device discovery signals according to the discovery resources indicated by the configuration information;

herein the positions of the discovery resource elements for sending the device discovery signals for the first time include:

resource positions when the discovery signals are sent for the first time during a process for sending the device discovery signals; and corresponding resource positions where the device discovery signals are sent in the first discovery resource period.

The first UE 4 is further arranged to generate an initial sequence of a pseudorandom sequence according to at least one of the following parameters: a user equipment identity, a physical cell identity and a discovery resource period identity;

generate the pseudorandom sequence according to the initial sequence and a pseudorandom sequence generation manner;

generate the positions of the discovery resource elements for sending the device discovery signals according to the pseudorandom sequence and at least one of the following parameters: an index of the discovery resource period and the number of the discovery resource elements in the discovery resource period; and determine the discovery resource elements corresponding to the positions of the determined discovery resource elements as the discovery resource elements for sending the device discovery signals.

The discovery resources are radio resources for device discovery.

The configuration information carries configuration parameters for device discovery, including parameters for indicating device discovery radio resources. For example, the discovery resources may be configured periodically, the discovery radio resources in each period are divided into the discovery resource elements in the manner of time division multiplexing and/or frequency division multiplexing, and each PPDCH is transmitted on one discovery resource element. The time length of the discovery resource element can be determined by taking a slot or subframe as a unit, for example, the time length of one discovery resource element may be 1 subframe; and the frequency bandwidth of the discovery resource element can be determined by taking a resource block as a unit, for example, the frequency bandwidth of one discovery resource element is 1 or 2 resource blocks.

In an embodiment, the network side device 2 is a base station or other network access device (e.g., microcell) or an upper network node, including a gateway, a mobility management entity (MME) and other server or network element providing services for D2D.

In an embodiment, the network side device 2 is a network element that is temporarily deployed in an out-of-network scenario.

In an embodiment, the network side device 2 is a UE serving as a cluster head or a primary UE to be applied to some specific scenarios such as an out-of-network scenario.

Figure 5:
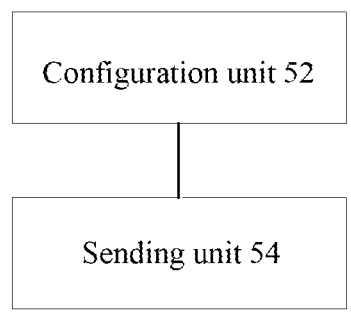
FIG. 5 is a structural schematic diagram of a network side device 2 according to an embodiment of the present disclosure.

FIG. 5 is a structural schematic diagram of the network side device 2 of a cellular network according to an embodiment of the present disclosure. As shown in FIG. 5, the network side device 2 of the cellular network includes:

a configuration unit 52 arranged to determine configuration information indicating discovery resources for device discovery; and a sending unit 54 arranged to send the configuration information.

In practical applications, the configuration unit 52 may be implemented by a central processing unit (CPU), a digital signal processor (DSP) or a field programmable gate array (FPGA) in the network side device 2 of the cellular network; and the sending unit 54 may be implemented by a transmitter in the network side device 2 of the cellular network.

There is a mapping relationship between discovery resource elements in adjacent discovery resource periods, the mapping relationship is used to determine at most one discovery resource element for sending device discovery signals in the current discovery resource period according to positions of the discovery resource elements which send the device discovery signals in the preceding discovery resource period of the current discovery resource period.

Specifically, the configuration unit is arranged to establish the mapping relationship of the discovery resource elements between the adjacent discovery resource periods;

establish mapping relationships k2=mod(floor((n1*K+k1+A)/N),K) and n2=mod(n1*K+k1+A,N); or establish mapping relationships n2=mod(floor((k1*N+n1+B)/K),N) and k2=mod(k1*N+n1+B,K); or establish mapping relationships k2=mod(k1+M,K) and n2=mod(n1+k1+L,N); or interleave frequency positions of the discovery resource elements in the preceding discovery resource period of the current discovery resource period using an interleaver, establish a mapping relationship between the frequency positions of the discovery resource elements in the preceding discovery resource period of the current discovery resource period and frequency positions of the discovery resource elements in the current discovery resource period according to the result of the interleaving, and then establish a mapping relationship of n2=mod(n1+k1+L,N);

herein floor(a) represents a rounding down operation; mod(a,b) represents a modulo operation; n1 and k1 identify time positions and frequency positions of the discovery resource elements in the preceding discovery resource period of the current discovery resource period, respectively; n2 and k2 identify time positions and frequency positions of the discovery resource element in the current discovery resource period, respectively; N represents the number of the discovery resource elements in a time direction; K represents the number of the discovery resource elements in a frequency direction; and values of A, B, M and L are all integers, for example, constants; or values of A, B, M and L are cell-specific parameters.

The cell-specific parameters include any one or more of the following forms of parameters:

physical cell identity;

a parameter configured by a network side device; and a parameter related to the discovery resource period, the value of which is an integer.

Specifically, the configuration unit is arranged to interleave positions of the discovery resource elements in the preceding discovery resource period of the current discovery resource period using the interleaver and establish a mapping relationship between the positions of the discovery resource elements in the preceding discovery resource period of the current discovery resource period and positions of the discovery resource elements in the current discovery resource period according to the result of the interleaving.

The sending unit is further arranged to send indication signaling which indicates the time positions and/or frequency positions of the discovery resource elements for sending the device discovery signals for the first time, and determine the time positions and/or frequency positions of the discovery resource elements for sending the device discovery signals according to the indication signaling or the indication signaling and the mapping relationship.

The positions of the discovery resource elements for sending the device discovery signals for the first time include:

resource positions when the discovery signals are sent for the first time during a process for sending the device discovery signals; and corresponding resource positions where the device discovery signals are sent in the first discovery resource period.

Figure 6:
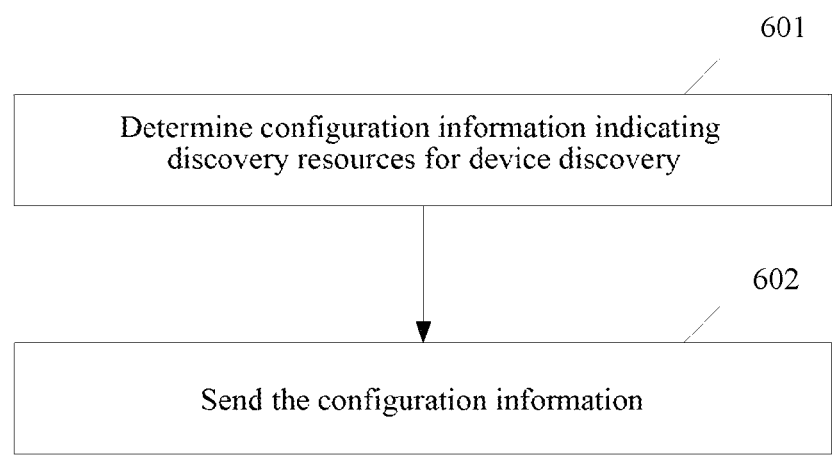
FIG. 6 is a flow chart 1 of a method for sending device discovery signals according to an embodiment of the present disclosure.

Accordingly, as shown in FIG. 6, a method for sending device discovery signals provided in the embodiment includes:

Step 601: determining configuration information indicating discovery resources for device discovery, the configuration information indicating the periodic discovery resource, discovery resource elements being obtained by dividing radio resources in the discovery resource period in a manner of time division multiplexing and/or frequency division multiplexing, and the discovery resource element being used by a user equipment to send the device discovery signals; and Step 602: sending the configuration information.

Figure 7:
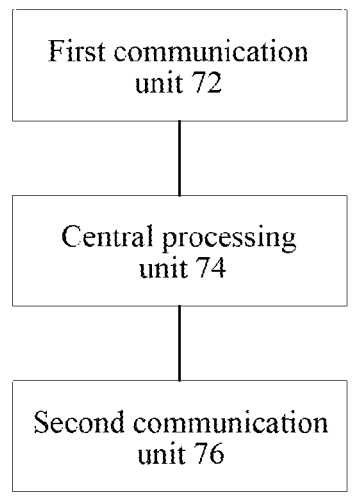
FIG. 7 is a structural schematic diagram of a communication device in the first UE 4 according to an embodiment of the present disclosure.

In an embodiment, the first UE 4 includes a communication apparatus shown in FIG. 7, which includes:

a first communication unit 72 arranged to receive configuration information indicating discovery resources for device discovery;

a central processing unit 74 arranged to determine, according to the configuration information, discovery resource elements for sending device discovery signals in a discovery resource period indicated by the configuration information; and a second communication unit 76 arranged to send the device discovery signals on the determined discovery resource elements.

The configuration information is configured at least to indicate the discovery resources, that is, radio resources for device discovery, herein the discovery resources is periodic, and the radio resources in the discovery resource period are divided into the discovery resource elements in a manner of time division multiplexing and/or frequency division multiplexing.

The central processing unit 74 is further arranged to establish a mapping relationship of the discovery resource elements between adjacent discovery resource periods; and determine at most one discovery resource element for sending the device discovery signals in the current discovery resource period according to the positions of the discovery resource elements which send the device discovery signals in the preceding discovery resource period of the current discovery resource period and the mapping relationship.

The central processing unit 74 is further arranged to establish mapping relationships $k2=\mathrm{mod}(\mathrm{floor}((n1*K+k1+A)/N),K)$ and $n2=\mathrm{mod}(n1*K+k1+A,N)$, or establish mapping relationships $n2=\mathrm{mod}(\mathrm{floor}((k1*N+n1+B)/K),N)$ and $k2=\mathrm{mod}(k1*N+n1+B,K)$; or establish mapping relationships $k2=\mathrm{mod}(k1+M,K)$ and $n2=\mathrm{mod}(n1+k1+L,N)$; or interleave frequency positions of the discovery resource elements in the preceding discovery resource period of the current discovery resource period using an interleaver, establish a mapping relationship between the frequency positions of the discovery resource elements in the preceding discovery resource period of the current discovery resource period and frequency positions of the discovery resource elements in the current discovery resource period according to the result of the interleaving, and then establish a mapping relationship of $n2=\mathrm{mod}(n1+k1+L,N)$;

herein floor(a) represents a rounding down operation; mod(a,b) represents a modulo operation; n1 and k1 identify time positions and frequency positions of the discovery resource elements in the preceding discovery resource period of the current discovery resource period, respectively; n2 and k2 identify time positions and frequency positions of the discovery resource element in the current discovery resource period, respectively; N represents the number of the discovery resource elements in a time direction; K represents the number of the discovery resource elements in a frequency direction; and values of A, B, M and L are all integers.

The central processing unit 74 is further arranged to interleave positions of the discovery resource elements in the preceding discovery resource period of the current discovery resource period using the interleaver and establish a mapping relationship between the positions of the discovery resource elements in the preceding discovery resource period of the current discovery resource period and positions of the discovery resource element in the current discovery resource period according to the result of the interleaving.

The central processing unit 74 is further arranged to randomly select the time positions of the discovery resource elements for sending the device discovery signals in the time direction of discovery resources in the current discovery resource period and establish the following mapping relationship between the frequency position of the discovery resource element in the preceding discovery resource period of the current discovery resource period and the frequency positions of the discovery resource elements in the current discovery resource period: $k2=\mathrm{mod}(k1+M,K)$;

herein n1 identifies the time positions of the discovery resource elements in the preceding discovery resource period of the current discovery resource period; n2 and k2 identify the time positions and frequency positions of the discovery resource elements in the current discovery resource period, respectively; N represents the number of the discovery resource elements in the time direction; K represents the number of the discovery resource elements in the frequency direction; and the value of L is an integer; or interleave the frequency positions of the discovery resource elements in the preceding discovery resource period of the current discovery resource period using the interleaver, establish a mapping relationship between the frequency positions of the discovery resource element in the preceding discovery resource period of the current discovery resource period and the frequency positions of the discovery resource elements in the current discovery resource period according to the result of the interleaving;

determine the frequency positions of the discovery resource elements for sending the device discovery signals in the current discovery resource period according to the frequency positions of the discovery resource elements which send the device discovery signals in the preceding discovery resource period of the current discovery resource period and one of the established mapping relationships; and determine the discovery resource elements corresponding to the selected time positions and the determined frequency positions as the discovery resource elements for sending the device discovery signals.

The central processing unit 74 is further arranged to determine positions of the discovery resource elements for sending the device discovery signals for the first time by any one of:

randomly select the positions of the discovery resource elements for sending the device discovery signals;

determine the time positions and/or frequency positions of the discovery resource elements for sending the device discovery signals according to a user equipment identity; and determine the time positions and/or frequency positions of the discovery resource elements for sending the device discovery signals according to the discovery resources indicated by the configuration information;

herein the positions of the discovery resource elements for sending the device discovery signals for the first time include:

resource positions when the discovery signals are sent for the first time during a process for sending the device discovery signals; and corresponding resource positions where the device discovery signals are sent in the first discovery resource period.

The central processing unit 74 is further arranged to generate an initial sequence of a pseudorandom sequence according to at least one of the following parameters: a user equipment identity, a physical cell identity and a discovery resource period identity;

generate the pseudorandom sequence according to the initial sequence and a pseudorandom sequence generation manner;

generate the positions of the discovery resource elements for sending the device discovery signals according to the pseudorandom sequence and at least one of the following parameters: an index of the discovery resource period and the number of the discovery resource elements in the discovery resource period; and determine the discovery resource elements corresponding to the positions of the determined discovery resource elements as the discovery resource elements for sending the device discovery signals.

In practical applications, the first communication unit 72 may be implemented by a receiver in the first UE 4, the central processing unit 74 may be implemented by a CPU, a DSP or an FPGA in the first UE 4, and the second communication unit 76 may be implemented by an transmitter in the first UE 4.

Figure 8:
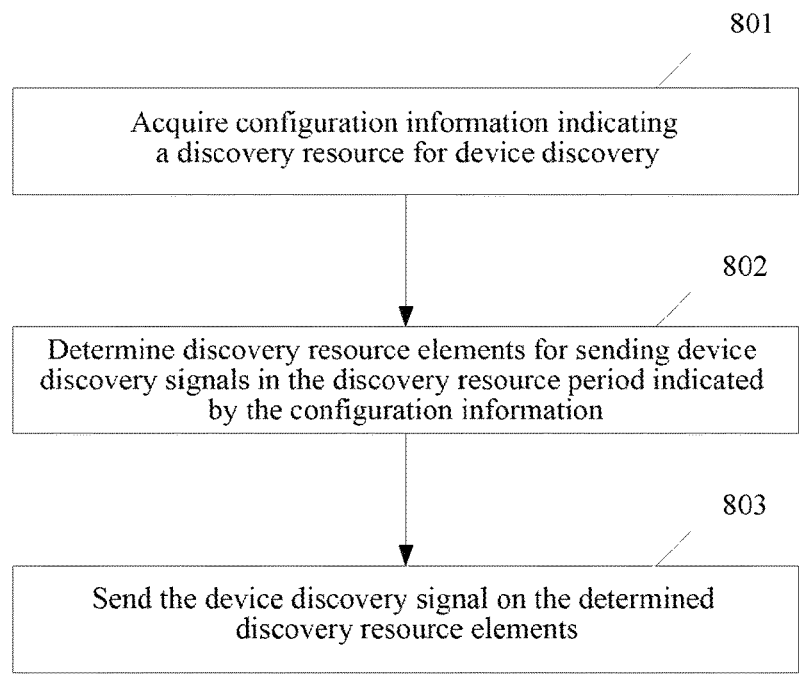
FIG. 8 is a flow chart 2 of a method for sending device discovery signals according to an embodiment of the present disclosure.

Accordingly, as shown in FIG. 8, a method for sending device discovery signals provided in the embodiment includes:

Step 801: acquiring configuration information indicating discovery resources for device discovery;

Step 802: determining discovery resource elements for sending the device discovery signals in a discovery resource period indicated by the configuration information, the discovery resource elements being obtained by dividing radio resources in the discovery resource period in a manner of time division multiplexing and/or frequency division multiplexing; determining discovery resource elements may include determining at most one discovery resource element in the discovery resource period; and Step 803: sending the device discovery signals on the determined discovery resource elements.

Embodiment 2

The D2D discovery described in the embodiments of the present disclosure is implemented based on the discovery signals transmitted directly between the UEs, herein the discovery signals are also called as beacons, and the transmission of the discovery signals needs to use the allocated radio resources. In the embodiment of the present disclosure, radio resources for device discovery are referred to as discovery resources, the discovery resources are periodic, and the device discovery radio resources in each discovery resource period are divided into discovery resource elements in a manner of time division multiplexing and/or frequency division multiplexing. In a discovery resource period, the allocated discovery radio resources are divided into the discovery resource elements, including N*K discovery resource elements, herein N and K are both positive integers, N is the number of the discovery resource elements in the time direction, K is the number of the discovery resource elements in the frequency direction, the position of each of the discovery resource elements corresponds to a coordinate (n, k), n is an integer not less than 0 and less than N, and k is an integer not less than 0 and less than K. The time length of the discovery resource element may be one subframe, two subframes, etc; the frequency bandwidth of the discovery resource element may be one, two or more than two resource blocks.

It should be noted that the discovery resource elements described in the related embodiments may represent physical resources or virtual resources. Representing the physical resources means that the resource blocks are physical resource blocks (PRB); representing the virtual resources means that the discovery resource elements need to be mapped to the physical resources. Moreover, the number of virtual resource elements may be different from that of physical discovery resource elements in a period, for example, the number of the physical discovery resource elements may be a multiple of the number of the virtual resource elements, that is, one virtual discovery resource element will correspond to a plurality of physical discovery resource elements.

For the UE which needs to send the device discovery signals, the discovery resource elements for sending the device discovery signals can be determined in the discovery resource period, and the device discovery signals can be sent on the determined resource discovery elements.

Further, determining at most one discovery resource element for sending the device discovery signals in the discovery resource period may include the UE sends the device discovery signals only once in each discovery resource period; or the UE sends the device discovery signals every a specific period, which is T times the discovery resource period, herein T is an integer greater than 1.

Embodiment 3

In an embodiment, a mapping relationship of discovery resource elements between adjacent discovery resource periods is established. Through the mapping relationship, a discovery resource element of which position is identified by a coordinate (n1, k1) in the preceding discovery resource period of the current resource period uniquely may correspond to a discovery resource element of which position is identified by a coordinate (n2, k2) in the current discovery resource period.

Thus, positions of the discovery resource elements for sending device discovery signals in the current discovery resource period can be determined according to positions of the discovery resource elements which send the device discovery signals in the preceding discovery resource period of the current discovery resource period and the mapping relationship.

In accordance with an aspect of the embodiment, the mapping relationship may be k2=mod(floor((n1*K+k1+A)/N),K) and n2=mod(n1*K+k1+A,N), herein floor(a) represents rounding down a, for example, floor(2,8)=2; mod(a,b) represents the value of a modulo b, for example, mod(8,3)= 2. The value of A may be an integer, for example, a constant, or A is a cell-specific parameter, including any one or more of the following forms of parameters:

physical cell identity (PCID);

a number calculated based on the physical cell identity, for example, A=mod(PCID,K) or A=mod(PCID,N);

a parameter configured by a network side device; and a parameter related to the discovery resource period, the value of which is an integer. For example, A may be a serial number of the discovery resource period such that the value of A is different when it is in different discovery resource periods.

It should be noted that the value A may be 0.

Or A may be determined based on N or K. For example, A=floor(N/2), or A=floor(K/2), or A is a prime number with respect to N or a prime number with respect to K.

Figure 9A:
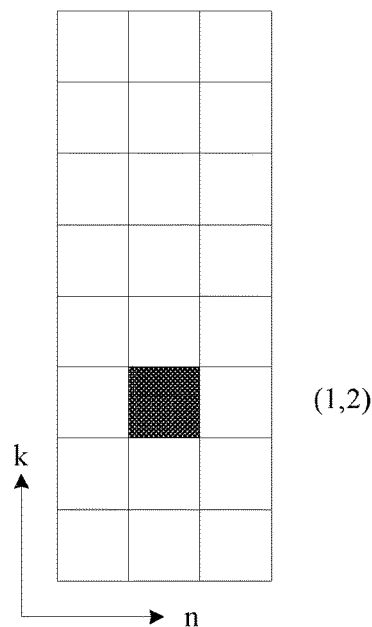
FIG. 9a is a schematic diagram 1 of positions of discovery resource elements in the preceding discovery resource period of the current discovery resource period according to an embodiment of the present disclosure.
Figure 9B:
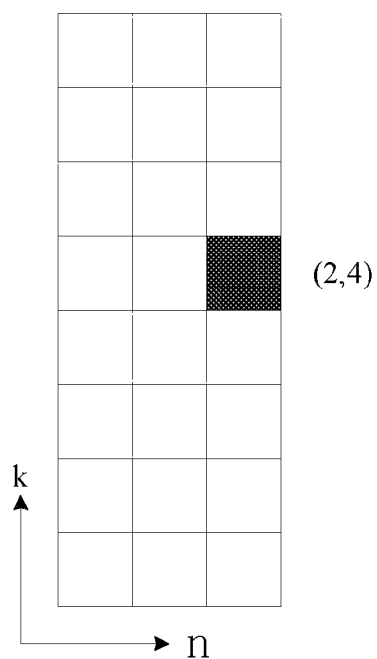
FIG. 9b is a schematic diagram 2 of positions of discovery resource elements in the current discovery resource period according to an embodiment of the present disclosure.

For example, assuming that N=3 and K=8, that is, there are 24 discovery resource elements in a discovery resource period. As shown in FIG. 9*a*, if a coordinate of a discovery resource element of a UE which sends device discovery signals in the preceding discovery resource period of the current discovery resource period is (1,2), and the value of A is 4, then as shown in FIG. 9*b*, a coordinate of the resource element which sends the device discovery signals in the current resource period is (2,4). Meanwhile, according to the embodiments described above, a coordinate of a discovery resource element in the next discovery resource period of the current discovery resource period can be acquired too. It should be noted that values of the coordinates described above and values of coordinates described subsequently are merely used for explaining the present disclosure but are not to be construed as a inappropriate limitation to the present disclosure.

In accordance with another aspect of the embodiment, the mapping relationships may be: n2=mod(floor((k1*N+n1+B)/K),N) and k2=mod(k1*N+n1+B,K). The meaning of each of the parameters in the mapping relationships is the same as described above and will not be repeated herein; types of parameters which can be adopted by the parameter B may be identical to types of parameters which can be adopted by the parameter A and will not be repeated herein.

In accordance with still another aspect of the embodiment, the mapping relationships may be: mod(k1+M,K) and n2=mod(n1+k1+L,N), herein M and L are integers, and types of parameters adopted by M and L are the same as types of parameters adopted by A and will not be repeated herein.

For example, still assuming that N=3 and K=8, if values of M and N are both 0 and the position of the discovery resource element which sends the device discovery signals in the preceding discovery resource period of the current discovery resource period is identified by a coordinate (1,2), then the coordinate (0,2) of the discovery resource element for sending the device discovery signals in the current discovery resource period can be determined according to the mapping relationships.

In accordance with yet another aspect of the embodiment, another mapping relationship is recorded. The process of determining the mapping relationship includes: interleaving frequency positions of discovery resource elements in the preceding discovery resource period of the current discovery resource period using an interleaver; establishing a mapping relationship between the frequency positions of the discovery resource elements in the preceding discovery resource period of the current discovery resource period and frequency positions of a discovery resource elements in the current discovery resource period according to the result of the interleaving.

Thus, the frequency positions of the discovery resource elements for sending device discovery signals in the current discovery resource period are determined according to the frequency positions of the discovery resource elements which send the device discovery signals in the preceding discovery resource period of the current discovery resource period and the mapping relationship. The interleaver, which may be an interleaver defined by an LTE system, may be designed with reference to LTE protocol 36.212.

Still assuming that K=8, the frequency positions of the discovery resource elements which send the device discovery signals in the preceding discovery resource period of the current discovery resource period are identified by a coordinate (n1, k1) (n1=1, k1=2), and positions 0-7 of frequency resources in the preceding discovery resource period of the current discovery resource period are changed to <1,5,3,7,0,4,2,6> after being interleaved by the interleaver of the LTE system, that is, k2=6.

According to the mapping relationship, a mapping relationship of time domain positions is: n2=mod(n1+k2+L,N), herein L is an integer, and types of parameters which may be adopted by L are the same as types of parameters which may be adopted by A and will not be repeated herein. Assuming that L=0, then n2=1 can be determined according to the mapping relationship, that is, the position of the discovery resource element for sending the device discovery signals in the current discovery resource period corresponds to a coordinate ((n2, k2) (n2=0, k2=6).

In accordance with yet still another aspect of the embodiment, still another relationship is recorded. The process of determining the mapping relationship includes: converting positions of the discovery resource elements in the preceding discovery resource period of the current resource period into a position sequence, interleaving the position sequence using the interleaver to obtain a new position sequence, and mapping the obtained position sequence to the discovery resource elements in the current discovery resource period. The interleaver, which may be an interleaver defined by the LTE system, may be designed with reference to LTE protocol 36.212.

When the positions of the discovery resource elements in the preceding discovery resource period of the current resource period are converted into the position sequence, the discovery resource elements may be numbered in a frequency priority manner. For example, assuming that N=3 and K=8, a sequence numbered as 0-23 is obtained after the discovery resource elements are numbered, as shown in FIG. 10*a*. therefore, the obtained sequence is interleaved using the interleaver defined by the LTE protocol to obtain serial numbers of the positions <9, 1, 17, 13, 5, 21, 11, 3, 19, 15, 7, 23, 8, 0, 16, 12, 4, 20, 10, 2, 18, 14, 6, 22>, the serial numbers of the positions are mapped to the discovery resource elements in the current discovery resource periods in a time priority or frequency priority manner to obtain positions of the discovery resource elements in the current discovery resource period. FIG. 10*b* is a schematic diagram of the positions of the discovery resource elements in the current discovery resource period that are determined according to the mapping relationship. The positions are determined in the current period using a frequency priority mapping manner.

As shown in FIG. 9*a*, assuming that a serial number of the position of the discovery resource element which sends the device discovery signals in the preceding discovery resource period of the current discovery resource period is 16, its coordinate is (2,0), then according to the mapping relationship, the serial number of the position of the discovery resource element for sending the device discovery signals in the current discovery resource period is 16, and its corresponding coordinate is (1,6). Thus, the device discovery signals are sent on the discovery resource element identified by the coordinate (1,6).

Of course, the positions of the discovery resource elements in the preceding discovery resource period of the current discovery resource period can be numbered using a time priority principle also, and the sequence of the positions of the interleaved discovery resource elements are mapped to the discovery resource elements in the current discovery resource period in the time priority or frequency priority manner.

It also should be noted that when the positions of the interleaved discovery resource elements are mapped to the discovery resource elements in the current discovery resource period, the starting position of the mapping may be mod(D,N*K), herein D is an integer not less than 0, types of parameters which can be adopted by D may be identical to types of parameters which can be adopted by A and will not be repeated herein. For example, when D=3, the positions of the discovery resource elements in the preceding discovery resource period of the current discovery resource period shown in FIG. 11*a* are interleaved and then mapped to the positions of the discovery resource elements in the current discovery resource period using the frequency priority mapping principle, as shown in FIG. 11*b*.

Embodiment 4

In an embodiment, time positions of discovery resource elements for sending device discovery signals are selected randomly in the time direction of discovery radio resources in a discovery resource period, and frequency positions of the discovery resource elements are determined according to a preset mapping relationship or a mapping relationship obtained by interleaving of an interleaver.

In an embodiment, the mapping relationship is k2=mod(k1+M,K); herein M is a constant of which the value is an integer, and types of parameters which can be adopted by M may be identical to types of parameters which can be adopted by A, and the meaning of each of the remaining parameters is the same as described above and will not be repeated herein.

In another embodiment, the frequency positions can be determined by the interleaver. The frequency positions of the discovery resource elements in the preceding discovery resource period of the current discovery resource period are interleaved by the interleaver, a mapping relationship is established between the frequency positions of the discovery resource elements in the preceding discovery resource period and the frequency positions of the discovery resource elements in the current discovery resource period according to the result of the interleaving, and the frequency positions of the discovery resource elements for sending device discovery signals in the current resource period are determined according to the frequency positions of the discovery resource elements which send the device discovery signals in the preceding discovery resource period and the mapping relationship.

Figure 12A:
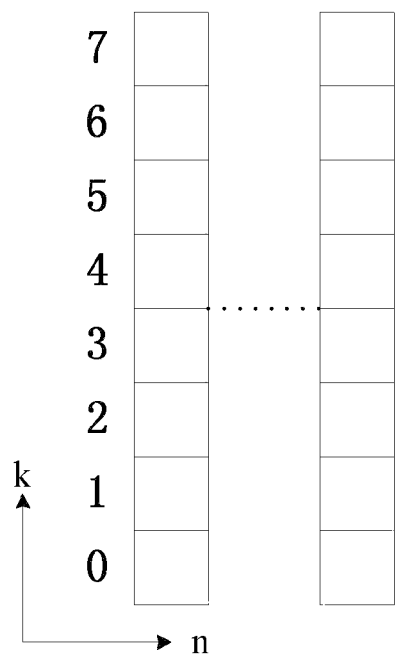
FIG. 12a is a schematic diagram 6 of positions of discovery resource elements in the preceding discovery resource period of the current discovery resource period according to an embodiment of the present disclosure.
Figure 12B:
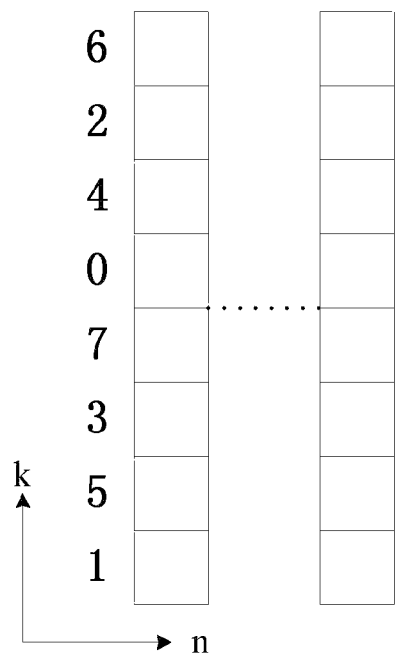
FIG. 12b is a schematic diagram 8 of positions of discovery resource elements in the current discovery resource period according to an embodiment of the present disclosure.

The interleaver may be an interleaver defined by the LTE system. As shown in FIG. 12a, there are 8 discovery resource elements numbered as 0-7 in the frequency direction in a discovery resource period, and a sequence <1, 5, 3, 7, 0, 4, 2, 6> is obtained after the interleaving of the LTE interleaver, as shown in FIG. 12b. A discovery resource element corresponding to the frequency position which is numbered as 5 in the preceding resource period of the current discovery resource period sends the device discovery signals, and a discovery resource element corresponding to the converted frequency position which is numbered as 5 in the current resource period sends the device discovery signals.

Embodiment 5

In an embodiment, when device discovery signals are sent for the first time, positions of discovery resource elements for sending the device discovery signals, including time and/or frequency resources, are selected randomly.

In an embodiment, before sending the discovery signals for the first time, a UE measures signal interference condition or signal energy in discovery resources and determines the positions of the discovery resource elements for sending the discovery signals according to a minimal interference or minimal energy principle.

In an embodiment, time and/or frequency positions of the discovery resource elements for sending the device discovery signals for the first time are determined according to an UE identity, for example, a UE_ID. For example, if the discovery resource elements in the discovery resource period are numbered as 0~(N*K−1), then the determined positions of the discovery resource elements of the UE for sending the device discovery signals are numbered as mod (UE_ID,N*K). The serial numbers of the positions of the discovery resource elements are obtained in a frequency priority or time priority manner, and the UE identity may be an identity of the UE in an idle or connected state, including an International Mobile Subscriber Identification Number (IMSI), an Temporary Mobile Subscriber Identity (TMSI), a Radio Network Temporary Identity (RNTI) or a part of a field in the identities.

In an embodiment, resource configuration of the device discovery signals are sent for the first time to a UE, that is, time and/or frequency positions of discovery resource elements for sending the device discovery signals for the first time are indicated to the UE through signaling. For example, a network side device (e.g., base station) indicates the positions of the discovery resource elements for sending the device discovery signals for the first time to the UE through specific RRC signaling.

The positions of the discovery resource elements for sending the device discovery signals for the first time are positions of the discovery resource elements used by the UE when the device discovery signals are sent for the first time in the process of sending the device discovery signals.

The positions of the resources which send the discovery signals for the first time are the positions of the discovery resource elements which send the device discovery signals in the first discovery resource period. For example, the discovery resource elements where the number of discovery resource periods is Nt can be configured one time through device discovery configuration information, the corresponding discovery resource periods are numbered as 0~(Nt−1), and the positions of the discovery resources of the device discovery signals sent by the UE for the first time are the corresponding discovery resource elements of the UE in a discovery resource period numbered as 0. When the UE sends the discovery signals for the first time in discovery resource periods numbered as a serial number greater than 0, the position of the discovery resource element which sends the device discovery signals are calculated according to the mapping relationship and the position of the discovery resource element numbered as 0.

Embodiment 6

In an embodiment, determining discovery resource elements for sending discovery signals includes the following steps.

First, an initial sequence of a pseudorandom sequence is generated according to at least one of the following parameters: a UE identity, a physical cell identity and a discovery resource period identity.

For example, the generation manner of the initial sequence of the pseudorandom sequence may be represented as $$c_{init} = \text{floor}\left(\frac{N_{ID}^{cell}}{N*K}\right),$$

herein $N_{ID}^{cell}$ represents a physical cell ID, and the meanings of N and K are the same as in the embodiments described above.

For example, the generation manner of the initial sequence of the pseudorandom sequence may be represented as $$c_{init} = \text{floor}\left(\frac{N_{ID}^{cell}}{N*K}\right),$$

herein the meanings of N and K are the same as in the embodiments described above, $N_{ID}^{UE}$ represents a UE identity (UE ID), and types of parameters which may be used by the UE ID includes:

International Mobile Subscriber Identification Number (IMSI);

a part of the IMSI, for example, a certain number of bits (e.g., 10 or 12 bits) of the IMSI;

Temporary Mobile Subscriber Identity (TMSI);

a part of the TMSI, for example, a certain number of bits (e.g., 10 or 12 bits) of the TMSI;

a Radio Network Temporary Identifier (RNTI) of a UE, including a Cell Radio Network Temporary Identifier (Cell-RNTI) and an RNTI related to D2D; and other IDs of the UE, for example, an application ID (APP ID).

In the formula described above which generates the initial sequence of the pseudorandom sequence, the denominator may be a constant, for example, a constant greater than N*K.

In the next place, the pseudorandom sequence is generated according to the initial sequence and the pseudorandom sequence generation manner.

The pseudorandom sequence may be generated with reference to the manner of implementing the LTE system. Specifically, the LTE standard protocol 36.211 may be referred.

In the next place, the serial numbers of the positions of the discovery resource elements for sending the device discovery signals are determined according to the pseudorandom sequence and at least one of the following parameters: an index of the discovery resource period and the number of the discovery resource elements in the discovery resource period.

For example, in the discovery resource period p (p represents a serial number (0,1,2, . . . ) of the discovery resource period), the serial numbers of the discovery resource elements for sending the discovery signals are determined according to the following formula:

$$\text{Pos\_Index} = (\Sigma_{i=0}^{m-1} c(m*p+i) \cdot 2^i) \bmod X,$$

herein Pos_Index represents the determined serial numbers of the positions of the discovery resource elements for sending the device discovery signals, m is a positive integer and meets $2^m > X$, and X is a positive integer and meets $X \geq N*K$, herein the value of X may also meet $X = N*K$.

After the serial numbers of the discovery resource elements for sending the discovery signals are determined, coordinates for identifying the positions of the discovery resource elements for sending the device discovery signals are determined according to the serial numbers. For example the coordinates of the discovery resource elements are determined according to $$n = \text{floor}\left(\frac{X}{Y}\right)$$

and k=mod(Pos_Index,K); or n=mod(Pos_Index,N) and $$k = \text{floor}\left(\frac{\text{Pos\_Index}}{N}\right);$$

herein the meaning of each of the symbols is the same as described above.

In the next place, the discovery signals are sent on the discovery resource elements corresponding to the determined positions of the discovery resource elements.

Apparently, those skilled in the art should understand that various elements or steps of the present disclosure described above may be implemented by general-purpose computing devices that may be centralized on a single computing device or distributed over a network consisting of a plurality of computing devices. Optionally, the elements or steps may be implemented by program codes executable by the computing devices such that they may be stored in storage devices and executed by the computing devices. Moreover, in some cases, the steps shown or described may be performed in an order different from that shown herein. Or the elements or steps can be made separately into individual integrated circuit elements, or some of them can be made into a single integrated circuit element. Thus, the present disclosure is not limited to any particular combination of hardware and software.

The above description is only embodiments of the present disclosure and is not intended to limit the present disclosure. Those skilled in the art should understand that the present disclosure may have various changes and modifications. Any modification, equivalent substitution, improvement and the like made within the spirit and principle of the present disclosure should be included in the protection scope of the present disclosure.

The above description is only embodiments of the present disclosure and is not intended to limit the patent scope of the present disclosure. Any equivalent structures or equivalent process transformations made based on the description and the accompanying drawings of the present disclosure or any direct or indirect application in other related technical fields are all included in the patent protection scope of the present disclosure.

In the several embodiments provided in the present application, it should be understood that the devices and methods disclosed can be implemented in other ways. The device embodiments described above are merely exemplary, for example, the classification of the elements is merely a classification of logic functions, and in practice implementations, there are other classification ways. For example, some of the elements or components may be combined or integrated into another system, or some features may be omitted or unexecuted. Moreover, coupling or direct coupling or communication connection between the components illustrated or discussed herein may be indirect coupling or communication connection of devices or elements by some interfaces or may be electrical connection, mechanical connection or the other forms of connection.

The elements described as separate components may be or may be not physically separated, and the components illustrated as elements may be or may be not physical elements, i.e., they may be located at one place or distributed in a plurality of network elements. Moreover, some of or all the elements may be selected according to actual demands to implement the purpose of the embodiments of the present disclosure.

In addition, the functional elements involved in the embodiments of the present disclosure may be all integrated into a processing element or each of the elements may be act as an element separately, or two or more than two of these elements may be integrated into one unit; the integrated element described above may be implemented in the form of hardware or may be implemented in the form of hardware plus software function elements.

It should be understood by those of ordinary skill in the art that all or some of the steps of the method embodiments can be implemented by program instruction related hardware. The program described above may be stored in a computer-readable storage medium. The program, when executed, executes the steps of the method embodiments described above. The storage medium described above includes a mobile hard disk drive, a read-only memory (ROM), a random access memory (RAM), a disk, a compact disc or another medium capable of storing program codes.

The above description is only specific embodiments of the present disclosure and the protection range of the present disclosure is not limit thereto. In the disclosed technical range of the present disclosure, alternations and substitutions, which are covered in the protection range of the present disclosure, may occur to those skilled in the art. Therefore, the protection scope of the present disclosure should be subject to the protection scope and the claims.

INDUSTRIAL APPLICABILITY

The embodiments of the present disclosure disclose a method, apparatus, device and system for sending device discovery signals. The half-duplex problem in the device discovery of device-to-device communication systems is solved by knowing the configuration information of the device discovery resources and sending the discovery signals on the discovery resources, so as to avoid the problem that the UEs cannot discover each other when sending and monitoring the discovery signals at the same time, and the versatility is strong.

What we claim is:

1. A method for sending device discovery signals, the method comprising:
    acquiring configuration information indicating discovery resources for device discovery;
    determining discovery resource elements for sending the device discovery signals in a discovery resource period indicated by the configuration information, wherein the discovery resource elements are obtained by dividing radio resources in the discovery resource period in a manner of time division multiplexing and/or frequency division multiplexing; and
    sending the device discovery signals in the discovery resource elements; wherein determining one discovery resource element at most for sending the device discovery signals in a discovery resource period indicated by the configuration information comprises:
    establishing a mapping relationship of the discovery resource elements between adjacent discovery resource periods; and
    determining at most one discovery resource element for sending the device discovery signals in a current discovery resource period according to positions of discovery resource elements which send the device discovery signals in a preceding discovery resource period of the current discovery resource period and the mapping relationship.

2. The method according to claim 1, wherein establishing a mapping relationship of the discovery resource elements between adjacent discovery resource periods comprises:
    establishing mapping relationships $k2=\mathrm{mod}(\mathrm{floor}((n1*K+k1+A)N),K)$ and $n2=\mathrm{mod}(n1*K+k1+A,N)$, or establishing mapping relationships $n2=\mathrm{mod}(\mathrm{floor}((k1*N+n1+B)/K),N)$ and $k2=\mathrm{mod}(k1*N+n1+B,K)$; or establishing mapping relationships $k2=\mathrm{mod}(k1+M,K)$ and $n2=\mathrm{mod}(n1+k1+L,N)$; or
    interleaving frequency positions of the discovery resource elements in the preceding discovery resource period of the current discovery resource period using an interleaver, establishing a mapping relationship between the frequency positions of the discovery resource elements in the preceding discovery resource period of the current discovery resource period and frequency positions of the discovery resource elements in the current discovery resource period according to a result of interleaving, and establishing a mapping relationship of $n2=\mathrm{mod}(n1+k1+L,N)$;
    wherein floor(a) represents a rounding down operation; mod(a,b) represents a modulo operation; n1 and k1 identify time positions and frequency positions of the discovery resource elements in the preceding discovery resource period of the current discovery resource period; n2 and k2 identify time positions and frequency positions of the discovery resource element in the current discovery resource period; N represents the number of the discovery resource elements in a time direction within one discovery resource period; K represents the number of the discovery resource elements in a frequency direction within one discovery resource period; and values of A, B, M and L are integers, wherein values of A, B, M and L are constants or cell-specific parameters;
    wherein the cell-specific parameters include any one or more of the following forms of parameters:
    physical cell identity;
    a parameter configured by the network side device; and
    a parameter related to the discovery resource period, the value of which is an integer.

3. The method according to claim 1, wherein establishing a mapping relationship of the discovery resource elements between adjacent discovery resource periods comprises:
    interleaving positions of the discovery resource elements in the preceding discovery resource period of the current discovery resource period using an interleaver and establishing a mapping relationship between the positions of the discovery resource elements in the preceding discovery resource period of the current discovery resource period and positions of the discovery resource elements in the current discovery resource period according to a result of interleaving.

4. The method according to claim 1, wherein determining discovery resource elements for sending the device discovery signals in a discovery resource period indicated by the configuration information comprises:
    randomly selecting time positions of the discovery resource elements for sending the device discovery signals in a time direction of discovery resources in the current discovery resource period; and
    establishing a following mapping relationship between frequency positions of the discovery resource elements in the preceding discovery resource period of the current discovery resource period and frequency positions of the discovery resource element in the current discovery resource period: $k2=\mathrm{mod}(k1+M,K)$; wherein n1 identifies the time positions of the discovery resource elements in the preceding discovery resource period of the current discovery resource period; n2 and k2 identify the time positions and the frequency positions of the discovery resource elements in the current discovery resource period; N represents the number of the discovery resource elements in the time direction within one discovery resource period; K represents the number of the discovery resource elements in the frequency direction within one discovery resource period; and the value of L is an integer and L is a constant; or
    interleaving the frequency positions of the discovery resource elements in the preceding discovery resource period of the current discovery resource period using the interleaver, establishing a mapping relationship between the frequency positions of the discovery resource elements in the preceding discovery resource period of the current discovery resource period and the frequency positions of the discovery resource elements in the current discovery resource period according to a result of interleaving;
    determining the frequency positions of the discovery resource elements for sending the device discovery signals in the current discovery resource period according to the frequency positions of the discovery resource elements which send the device discovery signals in the preceding discovery resource period of the current discovery resource period and one of the established mapping relationships; and
    determining the discovery resource elements corresponding to the selected time positions and the determined frequency positions as the discovery resource elements for sending the device discovery signals;
or
wherein the method further comprises:
determining positions of the discovery resource elements for sending the device discovery signals for the first time by any one of:
 randomly selecting positions of the discovery resource elements for sending the device discovery signals;
 determining the time positions and/or frequency positions of the discovery resource elements for sending the device discovery signals according to a user equipment identity; and
 receiving an indication signaling sent by a network side device, the indication signaling indicating the time positions and/or frequency positions of the discovery resource elements for sending the device discovery signals for the first time, and determining the time positions and/or frequency positions of the discovery resource elements for sending the device discovery signals according to the indication signaling or the indication signaling and the mapping relationship;
wherein the positions of the discovery resource elements for sending the device discovery signals for the first time includes:
resource positions when discovery signals are sent for the first time during a process for sending the device discovery signals; and corresponding resource positions where the device discovery signals are sent in the first discovery resource period indicated by the configuration information;
or
wherein determining discovery resource elements for sending the device discovery signals comprises:
 generating an initial sequence of a pseudorandom sequence according to at least one of following parameters: a user equipment identity, a physical cell identity and a discovery resource period identity;
 generating the pseudorandom sequence according to the initial sequence and a pseudorandom sequence generation manner;
 generating the positions of the discovery resource elements for sending the device discovery signals according to the pseudorandom sequence and at least one of following parameters: an index of the discovery resource period and the number of discovery resource elements in the discovery resource period; and
 determining the discovery resource elements corresponding to the positions of the determined discovery resource elements as the discovery resource elements for sending the device discovery signals.

5. A method for sending device discovery signals, the method comprising:
 determining configuration information indicating discovery resources for device discovery; the configuration information indicating periodic discovery resources, discovery resource elements being obtained by dividing radio resources in the discovery resource period in a manner of time division multiplexing and/or frequency division multiplexing, and the discovery resource elements being used by a user equipment to send the device discovery signals; and
 sending the configuration information; wherein there is a mapping relationship between the discovery resource elements of adjacent discovery resource periods; and the mapping relationship is used to determine the discovery resource elements for sending the device discovery signals in a current discovery resource period according to positions of the discovery resource elements which send the device discovery signals in a preceding discovery resource period of the current discovery resource period and the mapping relationship.

6. The method according to claim 5, wherein establishing a mapping relationship of the discovery resource elements between adjacent discovery resource periods comprises:
 establishing mapping relationships k2=mod(floor((n1*K+k1+A)N),K) and n2=mod(n1*K+k1+A,N), or
 establishing mapping relationships n2=mod(floor((k1*N+n1+B)/K),N) and k2=mod(k1*N+n1+B,K); or
 establishing mapping relationships k2=mod(k1+M,K) and n2=mod(n1+k1+L,N); or
 interleaving frequency positions of the discovery resource elements in the preceding discovery resource period of the current discovery resource period using an interleaver, establishing a mapping relationship between the frequency positions of the discovery resource elements in the preceding discovery resource period of the current discovery resource period and frequency positions of the discovery resource elements in the current discovery resource period according to a result of interleaving, and establishing a mapping relationship of n2=mod(n1+k1+L,N);
 wherein floor(a) represents a rounding down operation; mod(a,b) represents a modulo operation; n1 and k1 identify time positions and frequency positions of the discovery resource elements in the preceding discovery resource period of the current discovery resource period; n2 and k2 identify time positions and frequency positions of the discovery resource element in the current discovery resource period; N represents the number of the discovery resource elements in a time direction within one discovery resource period; K represents the number of the discovery resource elements in a frequency direction within one discovery resource period; and values of A, B, M and L are integers,
 wherein values of A, B, M and L are constants or cell-specific parameters; and
 the cell-specific parameters include any one or more of the following forms of parameters:
 physical cell identity;
 a parameter configured by a network side device; and
 a parameter related to the discovery resource period, the value of which is an integer.

7. The method according to claim 5, wherein establishing a mapping relationship of the discovery resource elements between adjacent discovery resource periods comprises:
 interleaving positions of the discovery resource elements in the preceding discovery resource period of the current discovery resource period using an interleaver and establishing a mapping relationship between the positions of the discovery resource elements in the preceding discovery resource period of the current discovery resource period and positions of the discovery resource elements in the current discovery resource period according to a result of interleaving.

8. The method according to claim 5, wherein the method further comprises:
 sending an indication signaling, the indication signaling indicating the time positions and/or frequency positions of the discovery resource elements for sending the device discovery signals for the first time, and determining the time positions and/or frequency positions of the discovery resource elements for sending the device discovery signals according to the indication signaling or the indication signaling and the mapping relationship;

wherein the positions of the discovery resource elements for sending the device discovery signals for the first time include:

resource positions when the discovery signals are sent for the first time during a process for sending the device discovery signals; and corresponding resource positions where the device discovery signals are sent in a first discovery resource period.

9. A apparatus for sending device discovery signals, the apparatus comprising:

a first communication unit arranged to receive configuration information indicating discovery resources for device discovery;

a central processing unit arranged to determine discovery resource elements for sending the device discovery signals in a discovery resource period indicated by the configuration information according to the configuration information, the discovery resource elements being obtained by the central processing unit dividing radio resources in the discovery resource period in a manner of time division multiplexing and/or frequency division multiplexing; and a second communication unit arranged to send the device discovery signals in the discovery resource elements; wherein the central processing unit is arranged to establish a mapping relationship of the discovery resource elements between adjacent discovery resource periods; and determine the discovery resource elements for sending the device discovery signals in a current discovery resource period according to positions of the discovery resource elements which send the device discovery signals in a preceding discovery resource period of the current discovery resource period and the mapping relationship.

10. The apparatus according to claim 9, wherein the central processing unit is arranged to establish mapping relationships $k2=mod(floor((n1*K+k1+A)/N),K)$ and $n2=mod(n1*K+k1+A,N)$, or establish mapping relationships $n2=mod(floor((k1*N+n1+B)/K),N)$ and $k2=mod(k1*N+n1+B,K)$; or establish mapping relationships $k2=mod(k1+M,K)$ and $n2=mod(n1+k1+L,N)$; or interleave frequency positions of the discovery resource elements in the preceding discovery resource period of the current discovery resource period using an interleaver, establish a mapping relationship between the frequency positions of the discovery resource elements in the preceding discovery resource period of the current discovery resource period and frequency positions of the discovery resource elements in the current discovery resource period according to a result of interleaving, and establish a mapping relationship of $n2=mod(n1+k1+L,N)$;

wherein floor(a) represents a rounding down operation; mod(a,b) represents a modulo operation; n1 and k1 identify time positions and frequency positions of the discovery resource elements in the preceding discovery resource period of the current discovery resource period; n2 and k2 identify time positions and frequency positions of the discovery resource elements in the current discovery resource period; N represents the number of the discovery resource elements in a time direction within one discovery resource period; K represents the number of the discovery resource elements in a frequency direction within one discovery resource period; and values of A, B, M and L are integers, wherein values of A, B, M and L are constants or cell-specific parameters;

wherein the cell-specific parameters include any one or more of the following forms of parameters:

physical cell identity;

a parameter configured by the network side device; and a parameter related to the discovery resource period, the value of which is an integer.

11. The apparatus according to claim 9, wherein the central processing unit is arranged to interleave positions of the discovery resource elements in the preceding discovery resource period of the current discovery resource period using an interleaver and establish a mapping relationship between the positions of the discovery resource elements in the preceding discovery resource period of the current discovery resource period and positions of the discovery resource elements in the current discovery resource period according to a result of interleaving.

12. The apparatus according to claim 9, wherein the central processing unit is arranged to randomly select the time positions of the discovery resource elements for sending the device discovery signals in a time direction of discovery resources in a current discovery resource period; and establish a following mapping relationship between the frequency positions of the discovery resource elements in the preceding discovery resource period of the current discovery resource period and the frequency positions of the discovery resource element in the current discovery resource period: $k2=mod(k1+M,K)$; wherein n1 identifies the time positions of the discovery resource elements in the preceding discovery resource period of the current discovery resource period; n2 and k2 identify the time positions and the frequency positions of the discovery resource elements in the current discovery resource period; N represents the number of the discovery resource elements in a time direction within one discovery resource period; K represents the number of the discovery resource elements in a frequency direction within one discovery resource period; and the value of L is an integer and L is a constant; or interleave the frequency positions of the discovery resource elements in the preceding discovery resource period of the current discovery resource period using an interleaver, establish a mapping relationship between the frequency positions of the discovery resource elements in the preceding discovery resource period of the current discovery resource period and the frequency positions of the discovery resource elements in the current discovery resource period according to a result of interleaving;

determine the frequency positions of the discovery resource elements for sending the device discovery signals in the current discovery resource period according to the frequency positions of the discovery resource elements which send the device discovery signals in the preceding discovery resource period of the current discovery resource period and one of the established mapping relationships; and determine the discovery resource elements corresponding to the selected time positions and the determined frequency positions as the discovery resource elements for sending the device discovery signals;

or the central processing is arranged to determine the positions of the discovery resource elements for sending the device discovery signals for the first time by any one of:

randomly selecting positions of the discovery resource elements for sending the device discovery signals;

determining time positions and/or frequency positions of the discovery resource elements for sending the device discovery signals according to a user equipment identity; and receiving an indication signaling sent by a network side device, the indication signaling indicating the time positions and/or frequency positions of the discovery resource elements for sending the device discovery signals for the first time, and determining the time positions and/or frequency positions of the discovery resource elements for sending the device discovery signals according to the indication signaling or the indication signaling and the mapping relationship;

wherein the positions of the discovery resource elements for sending the device discovery signals for the first time include:

resource positions when the discovery signals are sent for the first time during a process for sending the device discovery signals; and corresponding resource positions where the device discovery signals are sent in a first discovery resource period;

or the central processing unit is arranged to generate an initial sequence of a pseudorandom sequence according to at least one of the following parameters: a user equipment identity, a physical cell identity and a discovery resource period identity;

generate the pseudorandom sequence according to the initial sequence and a pseudorandom sequence generation manner;

generate the positions of the discovery resource elements for sending the device discovery signals according to the pseudorandom sequence and at least one of the following parameters: an index of the discovery resource period and the number of discovery resource elements in the discovery resource period; and determine the discovery resource elements corresponding to positions of the determined discovery resource elements as the discovery resource elements for sending the device discovery signals.

13. A apparatus for sending device discovery signals, the apparatus comprising:

a configuration unit arranged to determine configuration information indicating discovery resources for device discovery;

a sending unit arranged to send the configuration information, the configuration information indicating periodic discovery resources, discovery resource elements being obtained by dividing radio resources in the discovery resource period in a manner of time division multiplexing and/or frequency division multiplexing, and the discovery resource elements being used by a user equipment to send the device discovery signals;

wherein there is a mapping relationship between the discovery resource elements of adjacent discovery resource periods; and the mapping relationship is used to determine at most one discovery resource element for sending the device discovery signals in a current discovery resource period according to positions of the discovery resource elements which send the device discovery signals in a preceding discovery resource period of the current discovery resource period and the mapping relationship.

14. The apparatus according to claim 13, wherein the configuration unit is arranged to establish a mapping relationship of the discovery resource elements between adjacent discovery resource periods;

establish mapping relationships $k2=\mod(\text{floor}((n1*K+k1+A)N),K)$ and $n2=\mod(n1*K+k1+A,N)$, or establish mapping relationships $n2=\mod(\text{floor}((k1*N+n1+B)/K),N)$ and $k2=\mod(k1*N+n1+B,K)$; or establish mapping relationships $k2=\mod(k1+M,K)$ and $n2=\mod(n1+k1+L,N)$; or interleave frequency positions of the discovery resource elements in the preceding discovery resource period of the current discovery resource period using an interleaver, establishing a mapping relationship between the frequency positions of the discovery resource elements in the preceding discovery resource period of the current discovery resource period and frequency positions of the discovery resource elements in the current discovery resource period according to a result of interleaving, and establish a mapping relationship of $n2=\mod(n1+k1+L,N)$;

wherein floor(a) represents a rounding down operation; mod(a,b) represents a modulo operation; n1 and k1 identify time positions and frequency positions of the discovery resource elements in the preceding discovery resource period of the current discovery resource period; n2 and k2 identify time positions and frequency positions of the discovery resource element in the current discovery resource period; N represents the number of the discovery resource elements in a time direction within one discovery resource period; K represents the number of the discovery resource elements in a frequency direction within one discovery resource period; and values of A, B, M and L are integers, wherein values of A, B, M and L are constants or cell-specific parameters; and the cell-specific parameters include any one or more of the following forms of parameters:

physical cell identity;

a parameter configured by a network side device; and a parameter related to the discovery resource period, the value of which is an integer.

15. The apparatus according to claim 13, wherein the configuration unit is arranged to interleave positions of the discovery resource elements in the preceding discovery resource period of the current discovery resource period using an interleaver and establishing a mapping relationship between the positions of the discovery resource elements in the preceding discovery resource period of the current discovery resource period and positions of the discovery resource elements in the current discovery resource period according to a result of interleaving.

16. The apparatus according to claim 13, wherein the sending unit is arranged to send an indication signaling, the indication signaling indicating the time positions and/or frequency positions of the discovery resource elements for sending the device discovery signals for the first time, and determine the time positions and/or frequency positions of the discovery resource elements for sending the device discovery signals according to the indication signaling or the indication signaling and the mapping relationship;

wherein the positions of the discovery resource elements for sending the device discovery signals for the first time include:

resource positions when the discovery signals are sent for the first time during a process for sending the device discovery signals; and corresponding resource positions where the device discovery signals are sent in a first discovery resource period.

* * * * *